United States Patent
Sani et al.

(10) Patent No.: US 10,494,309 B2
(45) Date of Patent: Dec. 3, 2019

(54) COMPOSITE MATERIAL, COMPONENTS COMPRISING SAME AND METHOD OF USING SAME

(71) Applicant: ELEMENT SIX (UK) LIMITED, Didcot, Oxfordshire (GB)

(72) Inventors: Mohammad Najafi Sani, Didcot (GB); Xiaoxue Zhang, Didcot (GB); Suchi Subhra Mukherji, Didcot (GB)

(73) Assignee: Element Six (UK) Limited, Didcot, Oxfordshire (GB)

( * ) Notice: Subject to any disclaimer, the term of this patent is extended or adjusted under 35 U.S.C. 154(b) by 0 days.

(21) Appl. No.: 15/746,835

(22) PCT Filed: Aug. 17, 2016

(86) PCT No.: PCT/EP2016/069464
§ 371 (c)(1),
(2) Date: Jan. 23, 2018

(87) PCT Pub. No.: WO2017/029304
PCT Pub. Date: Feb. 23, 2017

(65) Prior Publication Data
US 2018/0215671 A1    Aug. 2, 2018

(30) Foreign Application Priority Data
Aug. 20, 2015   (GB) .................................. 1514839.8

(51) Int. Cl.
*C04B 35/83* (2006.01)
*C04B 35/16* (2006.01)
(Continued)

(52) U.S. Cl.
CPC .............. *C04B 35/83* (2013.01); *C04B 33/04* (2013.01); *C04B 33/36* (2013.01); *C04B 35/16* (2013.01);
(Continued)

(58) Field of Classification Search
CPC . B05D 5/083; B05D 7/14; B05D 7/56; B05D 3/12
See application file for complete search history.

(56) References Cited

U.S. PATENT DOCUMENTS 4,443,517 A    4/1984  Shah
4,477,094 A    10/1984 Yamamoto et al.
(Continued)

FOREIGN PATENT DOCUMENTS

GB    2118985 A    11/1983
GB    2200129 A    7/1988
(Continued)

OTHER PUBLICATIONS

United Kingdom Patent Application No. GB1514839.8, Combined Search and Examination Report dated Feb. 24, 2016, 7 pages.
(Continued)

*Primary Examiner* — Noah S Wiese
(74) *Attorney, Agent, or Firm* — Dean W. Russell; Clark F. Weight; Kilpatrick Townsend & Stockton LLP

(57) ABSTRACT

A composite material comprising 50 to 95 mass % grains of primary material selected from the group consisting of talc, mica, graphite and hexagonal boron nitride, and 0.01 to 40 mass % fibers having a length of 0.05 to 20 mm, and a ratio of length to diameter of at least 5. The grains of the primary material have a mean size of 3 to 50 microns.

21 Claims, 5 Drawing Sheets

(51) Int. Cl.
*C04B 35/20* (2006.01)
*C04B 35/52* (2006.01)
*C04B 35/583* (2006.01)
*C04B 35/76* (2006.01)
*C04B 35/80* (2006.01)
*C04B 33/04* (2006.01)
*C04B 33/36* (2006.01)

(52) U.S. Cl.
CPC ............ *C04B 35/20* (2013.01); *C04B 35/522* (2013.01); *C04B 35/583* (2013.01); *C04B 35/76* (2013.01); *C04B 35/80* (2013.01); *C04B 35/803* (2013.01); *C04B 35/806* (2013.01); C04B 2235/349 (2013.01); C04B 2235/3427 (2013.01); C04B 2235/386 (2013.01); C04B 2235/3826 (2013.01); C04B 2235/425 (2013.01); C04B 2235/427 (2013.01); C04B 2235/526 (2013.01); C04B 2235/5216 (2013.01); C04B 2235/5224 (2013.01); C04B 2235/5244 (2013.01); C04B 2235/5248 (2013.01); C04B 2235/5264 (2013.01); C04B 2235/5436 (2013.01); C04B 2235/604 (2013.01); C04B 2235/6021 (2013.01); C04B 2235/786 (2013.01)

(56) References Cited

U.S. PATENT DOCUMENTS

| | | | |
|---|---|---|---|
| 4,606,805 A * | 8/1986 | Bon | C25B 13/04 162/103 |
| 5,858,525 A | 1/1999 | Carter et al. | |
| 6,338,754 B1 | 1/2002 | Cannon et al. | |
| 2008/0254287 A1* | 10/2008 | Fukuoka | C04B 35/83 428/368 |
| 2009/0162672 A1* | 6/2009 | Dunn | C09K 3/1028 428/446 |
| 2012/0098213 A1 | 4/2012 | Damdar et al. | |
| 2012/0225299 A1* | 9/2012 | Takahashi | B05D 5/083 428/421 |
| 2014/0147340 A1 | 5/2014 | Howorth | |

FOREIGN PATENT DOCUMENTS

| | | |
|---|---|---|
| GB | 2489817 A | 10/2012 |
| JP | H04168189 A | 6/1992 |
| JP | 2002194331 A | 7/2002 |
| JP | 2009185152 A | 8/2009 |
| JP | 2012180938 A | 9/2012 |
| WO | 2006075149 A1 | 7/2006 |

OTHER PUBLICATIONS

United Kingdom Patent Application No. GB1614040.2, Combined Search and Examination Report dated Feb. 15, 2017, 8 pages.
International Patent Application No. PCT/EP2016/069464, International Search Report dated Jan. 2, 2017, 19 pages.
Japanese Patent Application No. 2018-509569, Office Action dated Mar. 22, 2019, 10 pages.
European Patent Application No. 16753901.4, Office Action dated Apr. 16, 2019, 6 pages.

* cited by examiner

COMPOSITE MATERIAL, COMPONENTS COMPRISING SAME AND METHOD OF USING SAME

FIELD OF THE INVENTION

This disclosure relates generally to composite material, particularly for use in a component of a capsule for an ultra-high pressure press; to a component comprising the material and to a method of using the component.

BACKGROUND

U.S. Pat. No. 5,858,525 discloses a high-pressure gasket comprising a major proportion of clay mineral such as talc and a minor proportion of a hard material powder such as silica, alumina or zircon. U.S. Pat. No. 6,338,754 discloses a high-pressure gasket comprising a major proportion of clay mineral such as talc and a minor proportion of garnet, with sodium silicate binder.

United States patent application publication number 2012/0098213 discloses gasket material comprising 75 to 90 wt. % inorganic filler material, 5 to 20 wt. % inorganic fibre material and 1 to 5 wt. % organic binder material. The inorganic filler material may be hydrophobic material such as talc, which is a platy material that orients itself in layers during the gasket material forming process to provide good sealant properties. Other examples of filler material include mica and boron nitride, and the filler material is preferably sub-micron powder having particle size of 0.2 to 1.5 microns. The fibre material may be silicic acid, kaolin, blends of silica and alumina, alkaline earth silicates known as glass wool, and may have a length of 1 to 6 mm and a diameter of 3 to 12 microns.

SUMMARY

There is a need for polycrystalline materials that can be compacted to high densities without sintering, and that are suitable for use in capsules for ultra-high pressure presses and exhibit substantially refractory properties.

There is a need for material and components suitable for use in ultra-high pressure press capsules, particularly but not exclusively gaskets, containment tubes, heater elements, or reaction compacts, that are sufficiently strong and dense. The components may be provided by compaction of powders at a relatively low temperature, and subjected to elevated temperature in use.

Viewed from a first aspect there is provided composite material comprising at least about 50 mass % to about 95 mass % grains of primary material selected from the group consisting of talc, mica, graphite and hexagonal boron nitride; and 0.01 mass % to about 40 mass % fibres having a length (or mean or median length) of 0.05 to 20 mm, and a ratio (or mean ratio) of length to diameter of at least 5; in which the grains of the primary material have a mean size of 3 to 150 microns.

Various combinations and compositions of composite material are envisaged by this disclosure, for which the following are non-limiting, non-exhaustive examples.

As an option, the fibres have a mean length of at least 0.1 mm, the ratio of length to diameter is at least 10 and the grains of the primary material have a mean size of 5 microns.

In some examples, the grains of the primary material may have a mean grain size of at least 10 microns, at least 30 microns; and/or at most about 100 microns, or at most about 70 microns.

In some examples, the primary material and the characteristics of the primary material grains are such that they can be compacted at a temperature of at most about 100° C. to at least 99.99%, 99.9%, or 95% of the density of the primary material in single crystal form, at sea level atmospheric pressure and ambient temperature of about 20° C. to 25° C.

In some examples, the volume (or mass) frequency distribution (with respect to grain size), of the primary material grains may have the characteristic that at least 90% of the grains (by volume or mass) are at least about 5 microns, at least about 10 microns, at least about 20 microns or at least about 30 microns.

In some examples, the composite material may comprise at least 0.01 mass %, at least about 1 mass % or at least about 5 mass %, and at most about 40 mass % grains of a secondary material comprising material selected from the group consisting of ceramic material, metal material, alloy material, intermetallic material, cubic boron nitride (cBN) or diamond. For example, the secondary material may comprise or consist of material selected from the group consisting of silica ($SiO_2$), alumina ($Al_2O_3$), garnet and zircon ($ZrSiO_4$). The mean or median size of the secondary material grains may be at least 1 micron, at least about 10 micron, or at least about 50 microns; and/or at most about 200 microns, at most about 150 microns, or at most about 100 microns. As an option, the secondary material grains have a hardness of more than 5 Mohs.

In some examples, the composite material may comprise at least 0.1 mass %, or at least 1 mass % fibres; and/or at most about 20 mass %, at most about 10 mass % or at most about 5 mass % fibres.

In some examples, the fibres may have a mean or median length at least about 12 times, at least about 15 times, at least about 20 times or at least about 25 times the mean or median length of the fibres. In some examples, the mean or median length of the fibres may be at least 0.15 mm, at least 0.2 mm, at least 0.5 mm, or at least 1 mm; and/or the mean or median length of the fibres may be at most about 30 mm, at most about 20 mm, at most about 15 mm, at most about 10 mm, or at most about 1 mm.

The statistical distribution of the fibre lengths may be relatively narrow or relatively broad; for example the full width at half maximum of the fibre length distribution may be at most about 20% or at most about 10% of the length corresponding to the mode (in other words, the length corresponding to the highest frequency in terms of mass or volume).

The length of the fibres may depend on the desired characteristics of the component to be made, such as a gasket, and/or on the size distribution of the primary material grains. For example, the mean or median length of the fibres may be at least about 5 times, at least about 10 times, at least about 50 times or at least about 100 times the mean or median size of the primary material grains; and/or the mean or median length of the fibres may be at most about 100,000 times, at most about 10,000 times or at most about 1,000 times the mean or median size of the primary material grains.

In some examples, the mean or median diameter of the fibres may be at least about 0.5 microns, at least about 1 micron or at least about 5 microns; and/or the mean diameter of the fibres may be at most about 100 microns, at most about 50 microns, at most about 20 microns, or at most about 10 microns. In some examples, the statistical distribution of the fibre diameters may exhibit a full width at half maximum of at most about 50% or at most about 20% of the diameter corresponding to the mode.

In some examples the fibres may be filaments, which are single fibres having extremely long length. The fibres may be flexible. The fibres may be chopped fibres, having substantially uniform length and diameter and prepared by cutting a loose assemblage of continuous fibres in a single strand, without twists. In some examples, the fibres may be chopped fibres having mean length of about 3 mm to about 15 mm; or the fibres may have a mean length of 0.1 mm to 0.5 mm, and have a mean diameter of 5 microns to 15 microns.

In various examples, the fibres may comprise or consist of carbon or ceramic material. For example, the fibres may comprise or consist of carbon filaments, carbon nanotubes, silicon carbide (SiC), silica ($SiO_2$), alumina ($Al_2O_3$), refractory aluminoborosilicate, aluminosilica, or alpha-$Al_2O_3$ with added $SiO_2$ (forming alpha-$Al_2O_3$/mullite). Example ceramic fibres may be substantially free of $B_2O_3$ glassy phase or may contain $B_2O_3$ glassy phase; for example, the fibres may comprise or consist of alpha-$Al_2O_3$ that is substantially free of glassy phases. In some examples, the fibres may comprise or consist of beta-SiC.

In some examples, the fibres may have tensile strength of at least about 1,500 MPa, or at least about 2,000 MPa; and/or at most about 3,500 MPa or at most about 2,500 MPa. In some examples, the fibres may have tensile modulus of at least about 100 GPa or at least about 200 GPa; and/or at most about 400 GPa, or at most about 250 GPa.

In some examples, the fibre material may comprise or consist of ceramic material, and may have hardness of at least 6 on the Mohs scale, such as silicon carbide or alumina, and may have the effect of reducing the flow of the composite material at high pressure. If the content of hard fibres is sufficiently high, for example at least about 30 mass % or about 40 mass %, then it may not be necessary to include a different secondary hard material in the composite material (in other words, in some examples the fibres may have the dual technical effects of sufficiently modifying the internal friction properties and flow behaviour of the primary material grains, as well as holding together the primary material grains).

In some examples, the fibres may comprise or consist of substantially refractory material. In some examples, the fibres may burn at elevated temperature, potentially leaving residue within a component, which may have positive effects on the behaviour of the component in use, or at least effects that are tolerable. For example, residue from burnt fibres may affect the flow and internal friction properties of a gasket in a desired way. In some examples, the material of the fibres may be selected to avoid the composite material becoming electrically conducting, or to reduce or increase the thermal conductivity as desired for a particular application. The fibres may be treated at sufficiently high temperature to remove substantially all organic coating from the surface; certain organic coatings may decompose to conductive carbon in neutral or reducing atmospheres when heated about 500° C. Polymer fibres may not be sufficiently hard for use in components for ultra-high pressure applications.

In various examples, the surface texture of the fibres may be relatively smooth or relatively rough; relatively rough surface texture may result in the compacted material having higher internal friction and/or the compacted material having greater strength, and the compacted material may exhibit less flow under load in use. In various examples, the fibres may be solid throughout their volumes or they may contain open or closed cavities, or may be hollow, and the transverse cross section shape of the fibres may be substantially circular, elliptical or polygonal; these factors may influence the strength with which they mechanically and/or chemically bond with and hold together the primary and/or secondary material grains. In some examples, the fibres may be provided comprising a minor amount of polymer or other material attached to their surface (which may arise from the process by which they are produced), which may be removed before blending them with the other materials. For example, residual polymer or other organic material on the fibres may be removed by burning, or may be left in place. In some examples, the fibres may be fully or partially coated with material to promote the bonding of the fibres with the primary and/or secondary material grains, and/or affect the internal friction and flow response of the compacted material.

The friction behaviour of the fibre material in contact with the primary or secondary material grains, and/or the surface roughness or other properties of the fibres may affect the response of a gasket to loading.

In some examples, the composite material may comprise or consist of inorganic binder material, such as boric acid or sodium silicate. In some examples, the composite material may comprise or consist of organic binder material.

In some examples, the primary material may comprise or consist of talc, and the fibres may comprise or consist of carbon fibres. The composite material may comprise grains of secondary material comprising silicon carbide, zircon or garnet.

In some examples, the composite material may comprise solvent and/or catalyst material for promoting the transformation of hBN into cubic boron nitride (cBN), and the primary material may consist of hexagonal boron nitride (hBN). For example, the composite material may be for a reaction compact for synthesising cubic boron nitride (cBN) by means of an ultra-high pressure press, and may comprise solvent and/or catalyst material that can promote the transformation of hexagonal boron nitride (hBN) to cBN (this material may be a single material having both solvent and catalytic function in the transformation process), and which comprises or consists of chemical compound including lithium (Li) and/or boron (B) and/or nitrogen (N), such as lithium boron nitride and/or ammonia. This may be present as a tertiary material. In some examples, the fibres may comprise or consist of carbon, and/or compound including titanium (Ti), and/or carbide ceramic material such as SiC or TiC, and/or nitride ceramic material such as TiN. In some examples, the composite material may include grains of cBN crystals having a mean size of at least 10 microns, which may function as seed crystals for synthesising cBN crystals; the content of the cBN grains may be at most about 10 mass % or at most about 1 mass %.

In some examples, the primary material may comprise or consist of graphite, and the fibres may consist of carbon, or carbide ceramic material.

In some examples, the composite material may be in the form of a compact (in other words a body comprising compacted powder grains, held together by mutually interlocking mechanical mechanisms) having density of at least about 95%, at least about 99% or at least 99.9% of the theoretical density of its constituent materials, the density contribution of each material weighted according to its mass % in the composite material. The fibres allow the compact to be heated at higher temperatures than would otherwise be possible. Alternatively, the composite material may be in the form of a loose, non-bonded aggregation of powder grains.

Viewed from a second aspect there is provided a component comprising example disclosed composite material, in which the component may be for a capsule assembly of an ultra-high pressure press (in assembled or unassembled form).

The component may be for use in a capsule assembly for an ultra-high pressure press, in which the ultra-high pressure may be at least about 1 GPa, at least about 5 GPa, at least about 7 GPa, at least about 8 GPa or at least about 10 GPa. In use, the component may be subjected to a temperature of at least about 1,000 degrees centigrade or at least about 2,000 degrees centigrade.

In some examples, the component may comprise or consist of a gasket, a containment vessel, an electrically conducting heater element, an electrical insulation component, or a reaction compact for a capsule assembly for an ultra-high pressure press.

In some examples, the component may comprise or consist of a gasket for a belt-type press, a tetrahedral-type press or a cubic-type press for pressurising a reaction assembly at an ultra-high pressure of at least 1 GPa.

In some examples, the component may comprise or consist of a heater element for a belt-type press, a tetrahedral-type press or a cubic-type press for pressurising a reaction assembly at an ultra-high pressure of at least 1 GPa; in which the primary material is graphite and the fibres consist of carbon or carbide ceramic material.

In some examples, the component may comprise or consist of a reaction compact for synthesising cBN crystals in a belt-type press, a tetrahedral-type press or a cubic-type press for pressurising a reaction assembly at an ultra-high pressure of at least 1 GPa. Reaction compacts for the crystallisation of cubic boron nitride (cBN) may comprise hexagonal boron nitride (hBN) as the primary material, since hBN is raw material for transformation into cBN in response to the application of sufficient temperature and in the presence of a suitable solvent and/or catalyst material, which may contain lithium. It may be desired to provide a reaction compact having high density prior to its assembly into a capsule for an ultra-high pressure press, so that the pressurisation of the capsule can be efficient in response to the application of load by anvils.

In some examples, fibres may be oriented with respect to some axis depending on a particular application. For example, the fibres may be randomly orientated within a gasket, and in other examples the fibres may be substantially aligned with each other, or at least with respect to proximate fibres within a volume of the component, and/or oriented with respect to the anvil surface or the direction of the applied force. In another example, fibres in a heater element may be oriented substantially parallel to each other and a direction of electric current flow, or generally perpendicular to the direction of current flow in use, depending on the desired overall electrical and potentially thermal or mechanical properties to be achieved for the component.

In some examples, the component may be for containing matter in solid and/or fluid state at an ultra-high pressure, comprising a containment element according to this disclosure. The component may comprise a pressure containment vessel (some example arrangements of pressure containment assemblies may comprise a plurality of pressure containment vessels) and or the containment element may comprise a pressure sealing element. The containment element may comprise (or be) a seal element (or gasket), a thermal insulation element and or an electrical insulation element.

The component may be for a belt type ultra-high pressure press, a cubic type ultra-high pressure press, a tetrahedral type ultra-pressure press, a Walker type press system or other type of ultra-high pressure press system. The component may be suitable for containing matter in the solid and or liquid state at an ultra-high pressure at ambient or elevated temperature.

Depending on the component and how it is to be used, the composite material may be electrically insulating, as in example gaskets or containment vessels comprising talc, or electrically conducting, as in example heating elements comprising graphite.

Examples of components comprising or consisting of example disclosed material may include components that are at risk of breaking after compaction at relatively low temperature, in other words at a temperature that insufficient for the grains to be sintered. Such compacted material will likely rely on mechanical mechanisms, such as interlocking grains and fibres, for their strength.

Example components may exhibit the aspect of reduced risk of unpredictable breaking or crumbling during the early stages of an ultra-high pressure cycle, such as when load is applied prior to activation of the heater system, and consequently of providing asymmetric support for the anvils or asymmetric heating of capsules.

Gaskets for ultra-high pressure presses and comprising or consisting of example composite material may have the aspect of effectively supporting load-applying anvils throughout an entire manufacturing cycle of super-hard material, for example, and thus extend the working lives of anvils. Example gaskets may enable more a desired apportionment of load applied by the anvil onto a capsule being pressurised on the one hand and the gasket on the other, and a more consistent apportionment of this load in different pressurising cycles and by different anvils in the same cycle. Gaskets comprising example composite material may enable more consistent apportionment of load by each anvil of the ultra-high pressure press onto opposites ends of a die of a belt-type system, or onto the various sides of a gasket of the cubic-type press, which may be desirable.

Viewed from a third aspect there is provided a method of using a disclosed example component, in which the component is for a capsule assembly for an ultra-high pressure press; and the method includes assembling a capsule including the component within the ultra-high pressure press, and using the ultra-high pressure press to pressurise at least a volume of the capsule assembly to at least 1 GPa, at least 5 GPa or at least 6 GPa. The ultra-high pressure may be at most 10 GPa.

In some examples, the method may include subjecting the component to an ultra-high pressure of at least about 0.5 GPa or at least about 1 GPa; and or at most about 10 GPa, at most about 5 GPa or at most about 2 GPa.

In some examples, the method may include heating the component to at least about 500 degrees Celsius, at least about 700 degrees Celsius or at least about 1,000 degrees Celsius; and/or a temperature of at most about 2,000 degrees Celsius, at most about 1,000 degrees Celsius or at most about 700 degrees Celsius.

In some examples, the component may consist of a gasket for a belt-type ultra-high pressure press comprising a pair of opposable anvils and a die, and the method may include providing a pair of the components; and assembling the capsule assembly within the die, in which each component is placed against a respective end of the die.

In some examples, the component may consist of a gasket for a cubic-type ultra-high pressure press, comprising three pairs of opposable anvils, and the method may include assembling the capsule assembly including the component between all three pairs of anvils.

There is provided a method of making disclosed example composite material and/or an example component, the method including providing a fibre aggregation consisting of the fibres, entangled with each other; combining the fibre aggregation with liquid medium, selected such that the liquid will not substantially react chemically with the fibres; subjecting the fibres and the liquid medium to ultrasonic vibration of sufficient amplitude and for a sufficiently long period for at least 50% of the fibres to be isolated in suspension in the liquid; separating the fibres from the liquid medium, and blending the fibres with the primary material grains to provide blended powder.

There is also provided a method of making example composite material and/or an example disclosed component, the method including combining the fibres in aggregate form (in which the fibres may be tangled with each other) with the primary material powder grains, and using mixing means to mix the primary material powder and the fibres in a dry condition, without the presence of a liquid medium. For example, the missing means may comprise a dual asymmetric centrifuge to provide blended powder.

A method of making an example component may include forming the blended powder into the shape of the component; and compacting the blended powder at a temperature sufficiently low for sintering of the primary material grains to be substantially avoided, to form the component. For example, the blended powder may be compacted at a temperature of at most 400° C., at most 300° C., at most 200° C., or at most 50° C. to form the component.

Viewed from a fourth aspect, there is provided composite material comprising 50 to 95 mass % grains of primary material having a mean grain size of 3 to 150 microns, and 0.01 to 40 mass % fibres having a mean length of 0.05 to 20 mm, and a ratio of length to diameter of at least 5; in which the primary material has the characteristic that it exhibits basal cleavage when in crystal form; and/or it has hardness on the Mohs scale of at most 2; and/or it has Young's modulus of at most 500 MPa when in crystal form; and/or it is suitable for use in a gasket for an ultra-high pressure press.

Example materials and combinations of materials disclosed in connection with example composite materials according to the first aspect may be applied in connection with the fifth aspect.

In various examples, the primary material may have a layered crystal structure and a 'platy', acicular or fibrous crystal habit. The microstructure of the primary material may be formed of layers that can slide relative to each other in response to an applied shear stress, generally aligned with the layers or crystallite plates. Compressive stress applied to the primary material along a direction that is substantially not aligned with the layers may increase the shear stress required to cause the plates to slide in relation to each other, causing the shear stress of such materials to increase significantly as compressive load is applied to it. While wishing not to be bound by a particular theory, this effect may be advantageous for materials that are suitable for use in high pressure gaskets. In other words, the greater the load applied onto the gasket, the more effectively the gasket may contain material being pressurised, owing to the increasing shear strength of the gasket. The internal friction of the gasket material may be a measure of the shear strength of the material and the shear force required to move the crystal layers relative to each other.

BRIEF DESCRIPTION OF THE DRAWINGS

Non-limiting examples will be described below with reference to the accompanying drawings, of which

DETAILED DESCRIPTION

Figure 1:
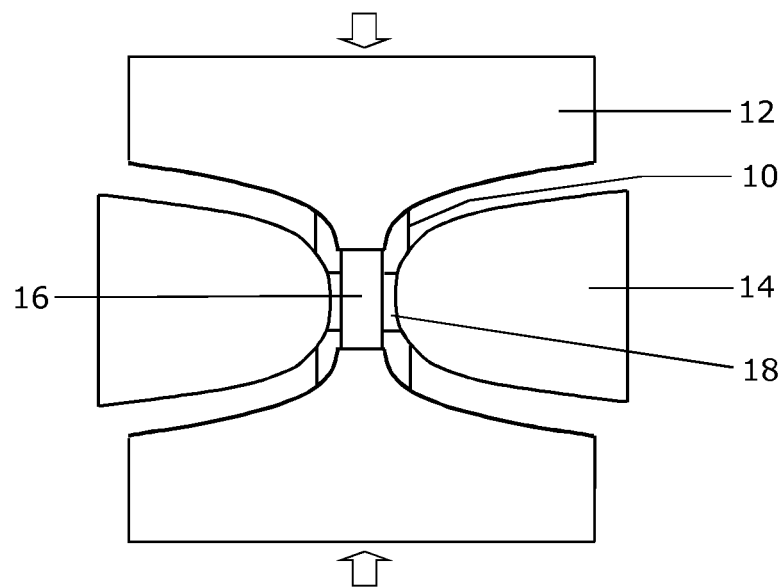
FIG. 1 shows a cross section view of a schematic example of part of a belt-type assembly for generating an ultra-high pressure and high temperature in a reaction volume for synthesising diamond and cubic boron nitride.

With reference to FIG. 1, a belt-type ultra-high pressure press apparatus comprises a die 14 and an opposable pair of anvils 12, in which an example capsule assembly is shown disposed within the die 14 and between the anvils 12. A reaction assembly 16 to be pressurise may be contained within a containment tube 18, and a pair of gaskets 10 are shown disposed between respective anvils 12 and opposite ends of the die 14. In use, the anvils 12 will be hydraulically driven towards each other, thus applying load onto the reaction assembly 16 to generate ultra-high pressure within it, and onto the gaskets 10 to increase their internal friction so that they will contain the reaction assembly 16 at the ultra-high pressure. For example, the ultra-high pressure may be 5 to 6 GPa, and the reaction assembly may be heated to at least about 1,250 degrees centigrade by means of an electric current passing through the anvils 12 and heater elements within the reaction assembly 16.

In some examples, the gaskets 10 may consist of example composite material, which may comprise talc and a plurality of carbon fibres. In some examples, the reaction assembly 16 may comprise example composite material, and may comprise material for growing crystals of synthetic diamond or cubic boron nitride (cBN), or for producing sintered units comprising diamond or cBN grains. For example, a reaction assembly 16 may comprise a reaction compact, which may be a solid cylinder formed of a compacted blend of raw material powder and catalyst material powder for growing cBN grains. The reaction compact may comprise hexagonal boron nitride (hBN) powder and fibres as disclosed, so that the reaction compact has sufficiently high density and strength. In some examples, a heater element within the reaction assembly 16 may comprise compacted graphite powder and carbon or ceramic fibres.

Figure 2:
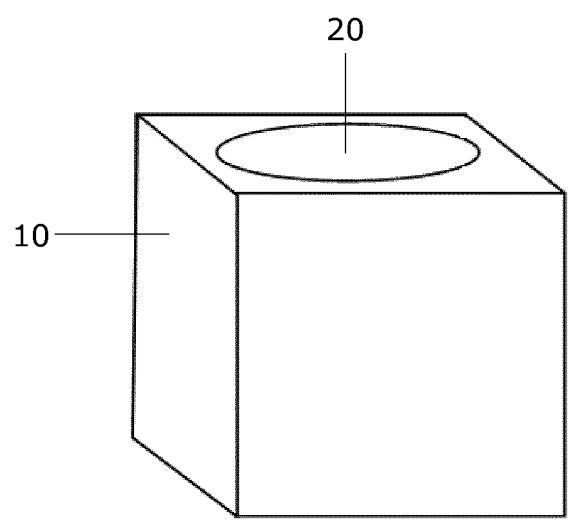
FIG. 2 shows a perspective view of a schematic example gasket for a cubic-type apparatus for generating an ultra-high pressure and high temperature in a reaction volume for synthesising diamond and cubic boron nitride.

FIG. 2 shows an example gasket 10 for a cubic-type apparatus (not shown) for generating an ultra-high pressure and high temperature in a reaction volume (not shown) inserted within a cavity 20 of the gasket 10. The gasket 10 may have the general external shape of a cube and may encapsulate the reaction volume in use, and consist of disclosed composite material.

In an example method of making example composite material, an aggregation of tangled fibres (for example chopped carbon fibres) may be combined with liquid in which the fibres can be dispersed and suspended, and subjected to ultrasonic vibration for a period sufficiently long for a substantial proportion of the fibres to be liberated from the aggregation and dispersed in the liquid. The liquid may be removed from the fibres by means of a rotary evaporator, for example, and a portion of the fibres combined with the primary material powder (in other words, the fibres may be dried and blended with the primary material grains). For example, dispersed and dried chopped carbon fibres may be blended with talc by means of a milling apparatus such as a ball mill. In some examples, secondary material powder such as silicon carbide, garnet or zircon may be blended with the primary material powder and fibres. The blended powders and fibres may be compacted at relatively low temperature, such as about 20 to 30° C., or at most about 200° C., such as by means of cold isostatic compaction to provide compacts, using a load sufficiently high to densify the powders to at least 90% of the maximum theoretical density of the particular combination of constituent materials. The blended powder may be compacted within a mould or against a mandrill configured for forming a compact having substantially the configuration of the desired component.

The internal friction and cohesion of the primary material grains can be measured and used to assess the potential effectiveness of the material grains for use in an ultra-high pressure gasket. The internal friction of the primary material grains will affects the shear strength of a compacted body comprising or consisting of the primary material grains. The thickness of a volume of primary or composite material being tested can be measured in response to various pressures applied to it using a Bridgman anvil, to assess its flow response to load. The parameters of friction and cohesion together with the boundary pressure can be used to calculate the pressure distribution as a function of the thickness of the gasket.

Particular non-limiting examples are described in more detail below.

In a first example, an article comprising talc powder, silicon carbide grains, boric acid binder material and carbon fibre material was made, based on a control powder blend comprising 60-70 mass % talc, 10-20 mass % silicon carbide and 15-25 mass % boric acid (subject to the constraint of the total combined mass % being 100%, apart from unavoidable impurities). Example material was made by blending 1.5 g (about 1 mass %) of chopped carbon fibre with 150 g of control powder.

Figure 3:
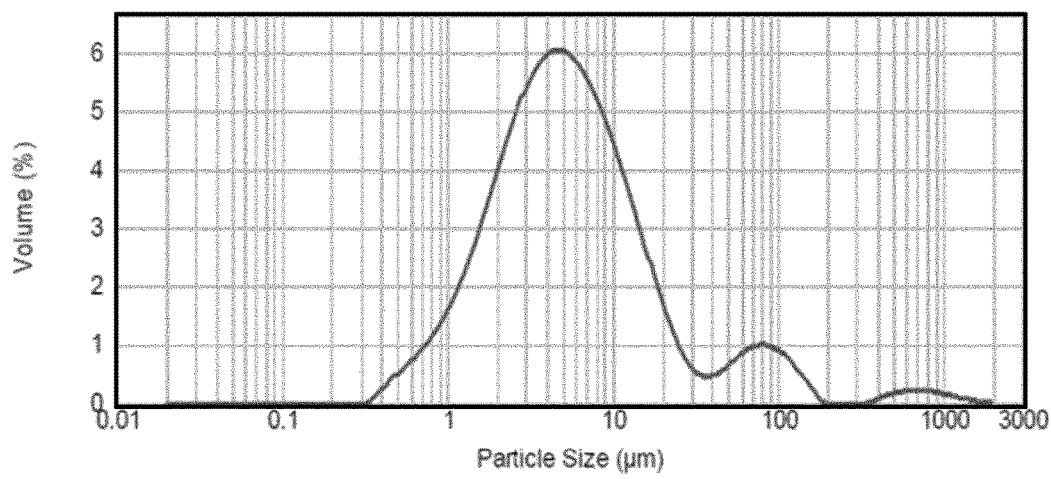
FIG. 3 shows the grain volume frequency distribution of blended talc, silicon carbide and boric acid powder in terms of equivalent circle diameter (ECD)
Figure 4A:
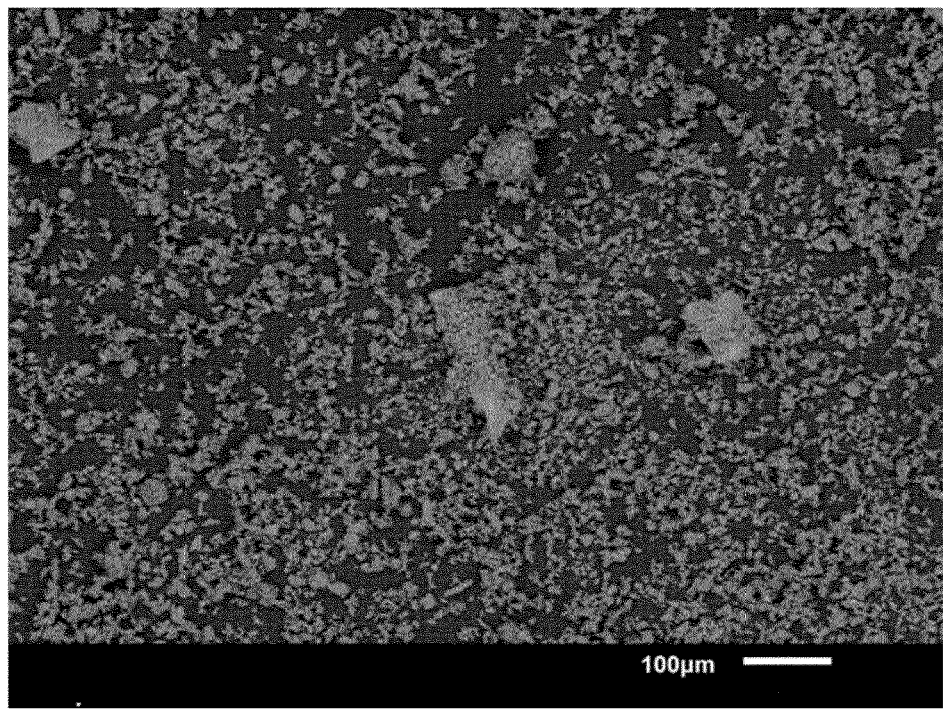
FIG. 4A shows a scanning electron microscope (SEM) image of the loose control powder blend consisting of grains of talc, SiC, and boric acid binder material, at 120 times magnification.
Figure 4B:
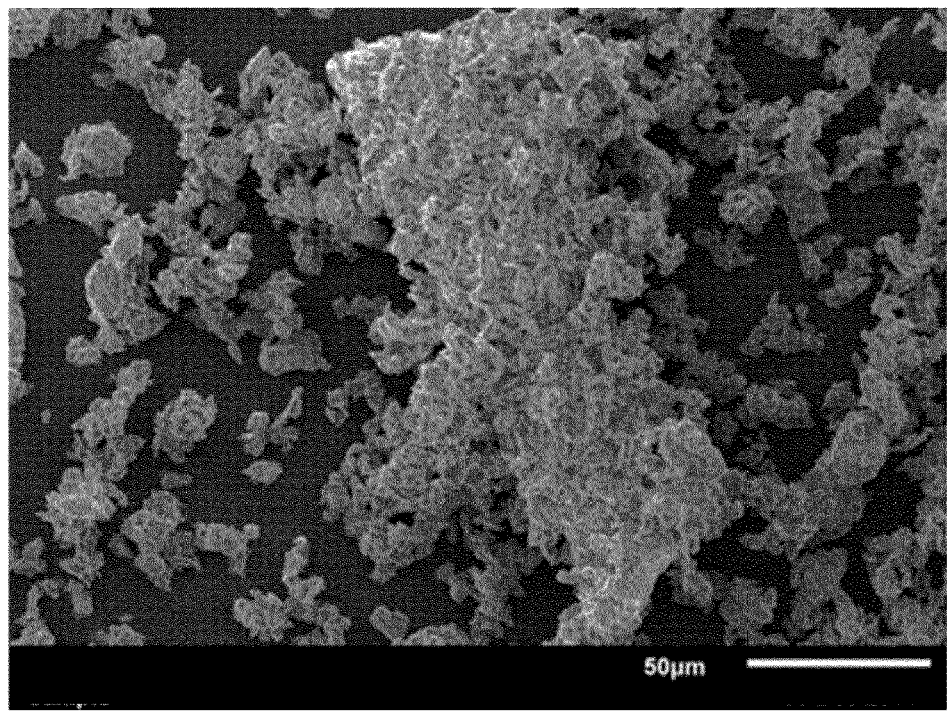
FIG. 4B shows an SEM image of the same powder at the higher magnification of 500 times.

The size distribution of the control powder blend consisting of talc, SiC and boric acid was measured and is shown in FIG. 3. The dominant peak having a mode of about 5 microns corresponds to the talc powder, and the peak having a mode of about 80 microns corresponds to the SiC grains. The small peak above about 500 microns may correspond to agglomerations of powder. The volume frequency distribution of the control powder blend, with respect to grain size, has the statistical characteristics that at least 90% of the grains are greater than about 25 microns, the median size is about 5 microns, the volumetric mean size is about 23 microns, and the surface mean size is about 3 microns. FIG. 4A and FIG. 4B show SEM images of the control powder blend at magnifications of 120 times and 500 times, respectively, the latter showing a SiC grain covered with much smaller grains of talc.

The chopped carbon fibres using in the example had a substantially uniform length of about 1 mm (tolerance of +5% and −1%) and were about 7 microns thick (tolerance of ±25%), and were supplied as entangled fibre aggregations by the supplier, Goodfellow™. In other examples, the fibre material may consist of ceramic material such as alumina or silica.

The chopped carbon fibres were dispersed by ultrasonic agitation, in which the 1.5 g of tangled carbon fibres was introduced into 200 g of 2-propanol and subjected to ultrasonic vibration for 10 minutes, after which the fibres were separated from each other and floated separately in the 2-propanol. This suspension was poured into a ball milling pot together with 150 g of the control powder blend and 300 g of tungsten carbide (WC) balls, and subjected to ball milling at 120 rotations per minute (RPM) for 5 minutes to provide an example powder blend. It was found that this combination of RPM, milling period and WC ball mass seemed to be effective for blending the powers substantially uniformly without substantial breakage of the carbon fibres (for example, 30 minutes of ball milling resulted in significant breakage of the carbon fibres). Merely mixing the powders at relatively low speed in a turbulator mixer comprising a rotating bottle did not yield sufficiently uniform blending. Although the ultrasonic treatment dispersed most of the carbon fibre, some remained attached to each other and the subsequent milling step helped to disperse them further. The blended powder and fibre slurry was sieved through a mesh sufficiently small to remove the WC balls and remaining minor amount of large aggregations of the carbon fibre, and then dried in a rotary evaporator to provide the example powder blend.

Figure 5:
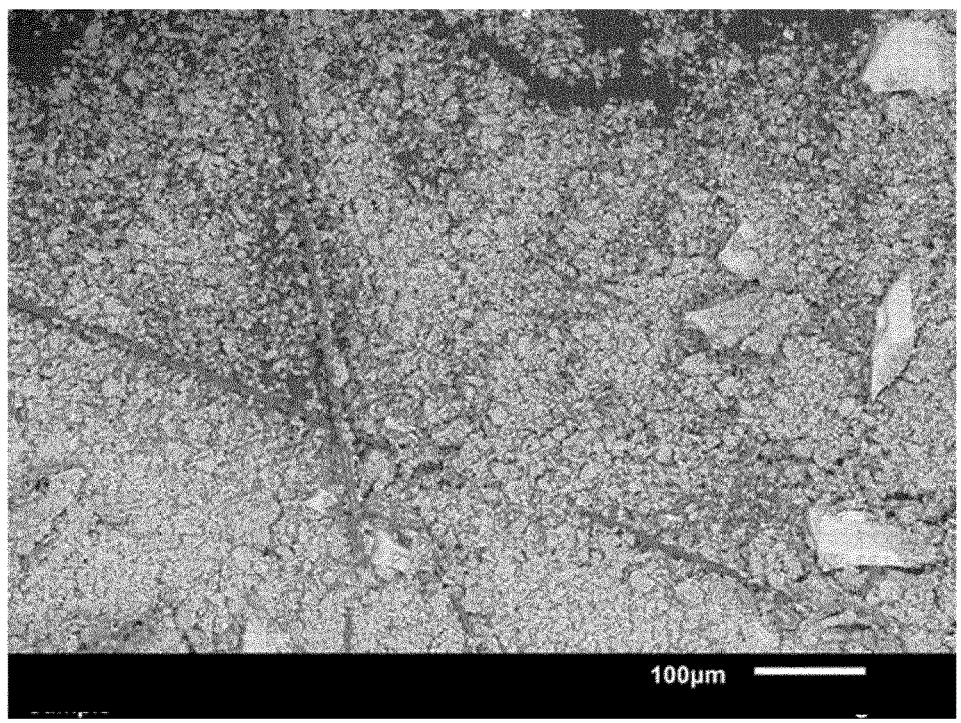
FIG. 5 shows a scanning electron microscope (SEM) image of the loose example powder blend consisting of grains of talc, SiC, boric acid binder material and carbon fibres, at 150 times magnification.

FIG. 5 shows an SEM image of example blended powder consisting of carbon fibres added to control blended powder, in which the carbon fibres appear as dark rod-like formations and the irregular shaped SiC grains are also evident. The talc powder appears as the much smaller grains.

The blended example powder was compacted in a two-step procedure, in which the first step involved uniaxially compacting the powder to form a solid precursor compact, and the second step involved subjecting the precursor compact to cold isostatic compaction (a single step of cold isostatic compaction will be effective if a larger amount of powder were used).

In the first compaction step, 30 g of the example powder was placed into the uniaxial compaction die having a diameter of 37.5 mm, and compacted under a force of 150 kN and a holding period of 15 seconds. A plurality of example pellets and a plurality of control pellets were thus produced, the control pellets having the same composition as the example pellets apart from the carbon fibres (the control discs consisted of the control powder blend of material from the same batch as the example powder blend). The mean height of the example pellets and the control pellets were 12.5 mm and 13.1 mm, respectively.

In the second compaction step, the example pellets and the control pellets were placed into (different) bags for isostatic compaction and compacted at a pressure of 200 MPa (2,000 bar) and ambient temperature (about 20-25° C.) for a holding period of 10 seconds. After this step, the pellets retained their diameter of 37.5 mm, and the example and control pellets had mean thicknesses of 12.33 mm and 12.30 mm, respectively. Both sets of pellets were very close to the maximum theoretical density of the particular combination of the talc, silicon carbide and boric oxide in the control powder blend, as determined using a pycnometer.

Figure 6A:
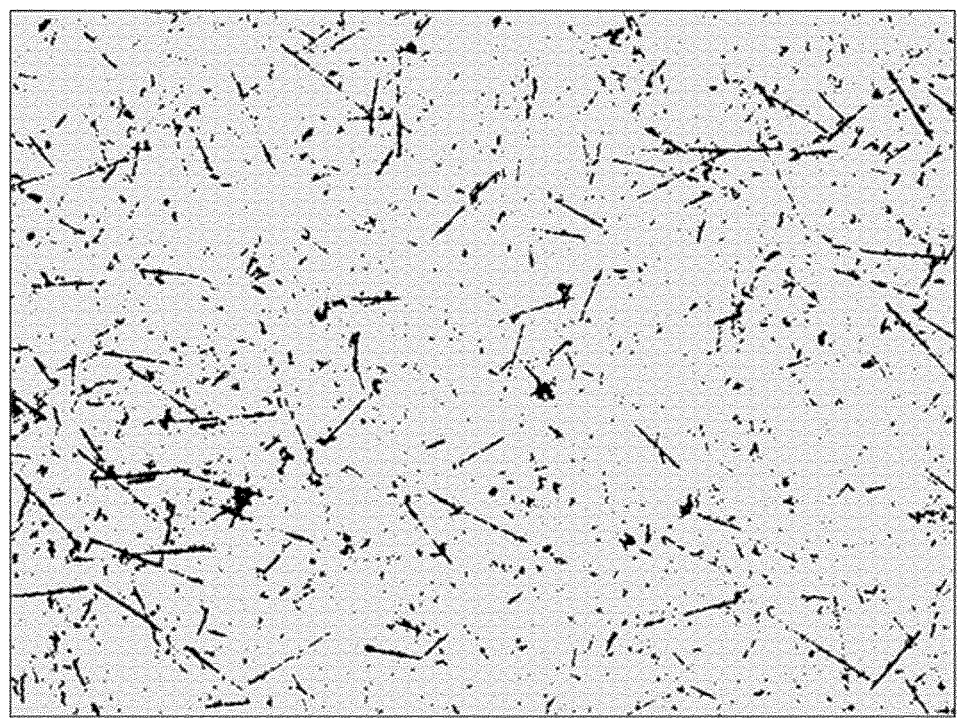
FIG. 6A shows a high contrast optical microscope image of an unbroken surface an example pellet.
Figure 6B:
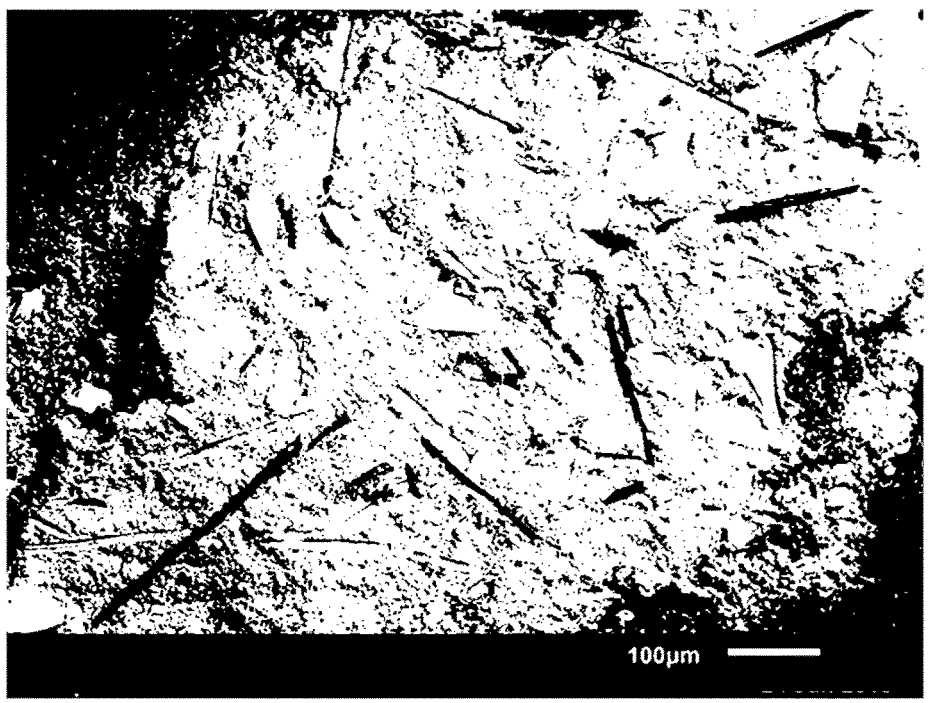
FIG. 6B shows a high contrast SEM image of a fractured surface of the example pellet using a magnification of 130 times.
Figure 6C:
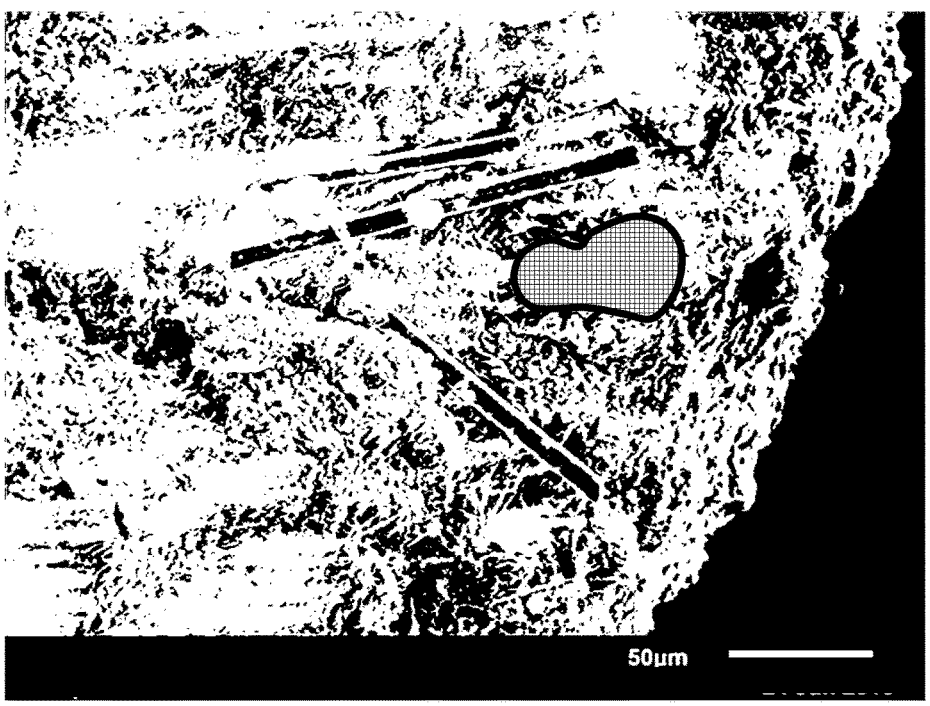
FIG. 6C shows a high contrast SEM image of the fracture surface using a magnification of 400 times (in which a SiC grain is highlighted by an outline and hatching).

The example and control pellets were then placed in an oven and heated to 300° C. at a rate of about 5° C. per minute, and for a dwell period of 15 minutes. This may simulate the temperature experienced by gaskets in some applications, including in an ultra-high pressure press. This resulted in all of the control discs cracking, whilst all of the example discs remained unchanged, as far as could be seen. An optical microscope image of an unbroken surface an example pellet is shown in FIG. 6A. SEM images of a fractured surface of the example pellets are shown in FIG. 6B and FIG. 6C using magnifications of 130 and 400 times, respectively, in which the carbon fibres appear as black rods (the images are shown in black and white contrast). A SiC grain can be seen in FIG. 6C, identified by an outline and hatching. The orientations of the carbon fibres within the discs appeared to be substantially random.

The cohesive strength and hardness of the example compacted material was apparently substantially greater than that of the control compacted material. The density of the example material (being the green density, since the temperature during compaction did not exceed 300° C. and so significant sintering could not have occurred) was relatively high.

In a second example, the effectiveness of dry-blending talc powder with carbon fibres, without using a liquid mixing medium was shown. A dual asymmetric centrifuge (DAC, commercially available as under the brand name SpeedMixer™) was used to blend 25 g talc and 0.25 g (1 mass %) carbon fibre aggregate, without including a step of ultrasonic disaggregation of the fibres or including a liquid medium. The DAC device operates by spinning a mixing arm at high speed in one direction while a vessel containing the powders and attached to the arm rotates in a counter direction, the combination of forces enabling rapid blending. The combination of the powder and the fibres was agitated at 3,000 revolutions per minute (rpm) for 1 minute, followed by agitation at 1,000 rpm for 1 minute without the presence of milling balls. The resulting mixture of powder and fibres was inspected and found to be as uniformly blended and the fibres as dispersed as was achieved using the ultrasonic liquid mixing method described in relation to the first example.

In general, material suitable for use in gaskets for ultra-high pressure capsules may comprise soft powder material, which may have a layered crystal structure and platy or fibrous crystal habit. Such material will likely be suitable as primary material in example composite material. It may exhibit low shear strength and it may be easy to compact to substantially full density at relatively low load. However, such material on its own may not exhibit all the properties and flow behaviour desired for the gasket, and it may be advantageous to combine it with a minor proportion of grains of at least one kind of much harder and stronger (secondary) material, which may function to modify the flow behaviour of the gasket to various degrees under loads of various magnitudes. In addition, it may be advantageous to include binder material to increase the strength of the gasket. In general, the relative amounts of the constituent materials and certain of their physical properties such as size and shape of the grains may be limited to within certain ranges, to ensure that the compaction of the material to form the gasket can be effective and that the gasket has sufficient strength prior to being subject to loading in use. In particular, certain ranges of compositions of constituent materials may result in the gasket strength being too low and delaminating or crumbling. In some examples, this may arise from the additional hard materials increasing the internal friction of the material, which may be advantageous for the flow behaviour of the gasket under high compressive load by increasing the compressive strength of the gasket, but which may introduce the disadvantageous effect of reducing the strength of the gasket under tensile strain and increase the risk of the gasket breaking apart prior to being loaded in use. So, on the one hand, the addition of the secondary material powder to the primary material powder may have the potential to improve the behaviour of a gasket comprising the latter, this may have the undesirable effect of reducing the cohesive strength of the gasket component when compressive load is not being applied to it. In other words, the presence of the secondary material grains may improve the performance of the gasket under compressive load, it may increase the risk of the gasket breaking or crumbling before it is subjected to the compressive load in use. If at least a portion of the gasket component crumbles prior to loading, the gasket may not be set up as desired at the beginning of a process and the pressurisation of a reaction assembly in use may be unpredictable as a result.

The introduction of fibres as disclosed, within the ranges of content disclosed, has the effect of mitigating the undesired effect of adding the secondary hard material to the primary material, The fibres can strengthen the gasket prior to its being subjected to compressive load, thus permitting substantially wider ranges of materials to be used in gasket material, thus allowing superior gaskets to be developed. Example gaskets may comprise combinations of materials that may otherwise have insufficient cohesive strength after being made by compaction at relatively low temperature (at which substantial sintering cannot occur), but before being compacted in use. In some examples, the presence of the fibres in the gasket may advantageously modify the flow behaviour of the gasket in use, and may allow the content of an (additional) secondary hard phase to be reduced or eliminated. Certain fibre materials, for example carbon fibres, may not substantially or negatively affect the behaviour of a gasket in use, provided that the quantity of the fibres is within disclosed limits. The combination of primary material grains and fibres as disclosed may positively affect the gasket behaviour of the composite material even if secondary material is not present.

Some example composite material may have the aspect that the fibres hold together the clay mineral and other grains present in the article. Some chemical bonding between the fibres and the grains may occur.

The manufacture of example composite material using a method including dry blending of the powder as opposed to mixing in a liquid medium may have the aspect that relatively large grains of the primary material can be used. Relatively larger grains of talc, for example, will likely be significantly lower in cost than sub-micron powder.

Components comprising example composite material, for use in ultra-high pressure applications may comprise relatively large grains of the primary powder. While wishing not to be bound by a particular theory, this may be because voids will be substantially eliminated by the very high pressure; and/or because the flow behaviour of such components may be less sensitive to the size of the primary grains at very high pressure. In general, it may be expected that gasket material would exhibit more suitable flow behaviour if the grains are very small. This aspect may be particularly (but not exclusively) the case when the primary material is talc.

Example composite material may have the aspect that relative strong components can be manufactured by compacting the primary powder material at relatively low temperature, too low for grain growth or sintering to occur, and avoiding delamination. If the content of the fibres is too high, then the composite material may lack the desired flow or compaction behaviour in response to an applied compressive force. If the content of the fibres is too low, the composite material may lack sufficient strength after compaction at relatively low temperature (i.e. its green strength may be too low), and it may exhibit cracking and delamination.

A gasket for an ultra-high pressure press and comprising example composite material may have the aspect of extending the working lives of the anvils of the press, which will bear against the gasket in use. Since the gasket will likely have enhanced cohesive strength, the reaction forces bearing on the anvils may be more uniform and reproducible. The fibres may function to hold together the composite material and reduce the risk of the gasket crumbling and some of it being lost while the anvils compress the gasket to seal the capsule components at an ultra-high pressure.

While wishing not to be bound by a particular theory, the presence of hard grains such as garnet or zircon within a matrix of compacted soft material such as talc may have the effect of reducing the flow and deformation of the composite material at high pressure.

While wishing not to be bound by a particular theory, the fibres may strengthen the composite material by mechanically binding together the primary material powder.

Example disclosed material may exhibit an improved green strength in comparison to material having substantially the same composition and made in the same way, but not comprising the fibre material. The improvement in green strength may be about 5 to 25%.

Certain terms as used herein will be briefly explained below.

As used herein, composite material comprises or consists of two or more constituent materials that differ substantially in respect of at least one physical or chemical property, such that at least one physical or chemical property of the composite material differs substantially from that of any one of the constituent materials, and the constituent materials are distinct within the composite material; in which two or more (or all) of the constituent materials are in the form of a plurality of grains or fibres. Composite material may comprise at least 50 mass % of a first of the constituent materials, and less than 50 mass % of a second of the constituent materials, the grains of which may be dispersed within a matrix formed by the first constituent material. The grains of the constituent materials may be substantially uniformly dispersed with respect to each other. 'Composite material' as used herein may be referred to as 'polycrystalline composite material'.

The Mohs Scale of Hardness measures the relative hardness of a solid material in terms of how resistant that substance is to being scratched, and on the Mohs scale, one substance is harder than another if it can scratch it. The scale ranges from 1 to 10, in which natural diamond has a hardness of 10 on the Mohs scale and talc is among the softest materials, having a hardness of 1 on this scale. For example, a diamond will scratch garnet, which has a Mohs scale hardness of 6.5 to 7.5, but not the other way around, so a diamond is harder than garnet. Graphite has a hardness of about 1 to 2 on the Mohs scale. A Mohs scale hardness of 6 corresponds to a Vickers $HVN_{100}$ hardness of about 800 to about 1,500 kg/mm$^2$.

The 'green strength' of a compacted body comprising of consisting grains and/or fibres is its strength prior to any inter-grain bonding or sintering, which may usually be effected by heating. For example, talc powder compacted at about 25 to about 250° C. will not exhibit inter-grain sintering and the grains will be held together mainly by mechanical inter-locking, and its strength can be referred to as 'green strength'.

In the art of mineralogy, 'cleavage' is the tendency of crystalline materials to split along definite crystallographic structural planes. These planes of relative weakness are a result of the regular locations of atoms and ions in the crystal, which create smooth repeating surfaces that are visible both in the microscope and to the naked eye. Basal or pinacoidal cleavage occurs parallel to the base of a crystal. This orientation is given by the {001} plane in the crystal lattice (see Miller indices), and is the same as the {0001} plane in Bravais-Miller indices, which are often used for rhombohedral and hexagonal crystals. Basal cleavage is exhibited by the mica group, talc and graphite.

As used herein, ceramic materials are inorganic, non-metallic, non-polymeric materials, which may be formed of compounds including at least one metal (for example aluminium, silicon) and at least one non-metal (for example oxygen, nitrogen, carbon). Ceramic materials include phyllosilicate materials such as pyrophyllite, mica, mullite, kaolinite, and other ceramic materials such as magnesium oxide. Pyrophyllite comprises aluminium silicate hydroxide ($Al_2Si_4O_{10}(OH)$) and can be found as a naturally occurring mineral in metamorphic rocks, and has been used for containment vessels at ultra-high pressure and high temperatures. Pyrophyllite can deform and flow to some extent under very high pressure, making it suitable for use in gaskets for ultra-high pressure presses, and has a low thermal conductivity, making it suitable for use in heat containment components. Talc comprises hydrated magnesium silicate: $H_2Mg_3(SiO_3)_4$ or $Mg_3Si_4O_{10}(OH)_2$. Its crystal system is monoclinic or triclinic, and has a foliated or fibrous crystal habit, the folia being substantially non-elastic. Talc is extremely soft, having hardness of 1 on the Mohs scale, and has a low shear strength and can be used in lubrication applications.

As used herein, references to 'graphite' will include graphite or material comprising at least about 66 weight percent sp2-bonded carbon.

Garnet has hardness on Mohs scale of 6.5 to 7.5. It exhibits indistinct cleavage, rhombic dodecahedron or cubic crystal habit, and isometric/cubic rhombic dodecahedron, icositetrahedron crystal system.

Super-hard material has hardness at least that of cubic boron nitride (cBN), including natural or synthetic diamond crystals, polycrystalline cBN (PCBN) material, or polycrystalline diamond (PCD) material.

An ultra-high pressure, high temperature (HPHT) press can also be referred to as an ultra-high pressure furnace and is capable of subjecting a body to an ultra-high pressure and high temperature. As used herein, ultra-high pressure is at least about 1 GPa.

Examples of fibre materials may include aramide fibre, carbon fibre, glass fibre and mineral fibre (which may also be referred to as "mineral wool", formed of inorganic fibres consisting of metal silicates). Aramide fibres are formed of aromatic amide material, glass fibre is formed of inorganic complex of metal silicates.

Gaskets are used to create a static seal between two stationary members of a mechanical assembly and to maintain that seal under operating conditions, which may vary dependent upon changes in pressures and temperatures. A gasket may provide a seal in response to external forces applied onto it, causing gasket material to flow into the imperfections and spaces between the mating surfaces.

As used herein, grain sizes expressed in length units such as micrometers (microns), as opposed to mesh size, will refer to the equivalent circle diameters (ECD), in which each grain is regarded as though it were a sphere. The ECD distribution of a plurality of grains can be measured by means of laser diffraction, in which the grains are disposed randomly in the path of incident light and the diffraction pattern arising from the diffraction of the light by the grains is measured. The diffraction pattern may be interpreted mathematically as if it had been generated by a plurality of spherical grains, the diameter distribution of which being calculated and reported in terms of ECD. Aspects of a grain size distribution may be expressed in terms of various statistical properties using various terms and symbols. Particular examples of such terms include mean, median and mode. The size distribution can be thought of as a set of values Di corresponding to a series of respective size channels, in which each Di is the geometric mean ECD value corresponding to respective channel i, being an integer in the range from 1 to the number n of channels used.

Mean values obtained by means of laser diffraction methods may be most readily expressed on the basis of a distribution of grain volumes, the volume mean can be represented as D[4,3] according to a well-known mathematical formula. The result can be converted to surface area distribution, the mean of which being D[3,2] according to a well-known mathematical formula. Unless otherwise stated, mean values of grain size distributions as used in the present disclosure refer to the volume-based mean D[4,3], and the mean of other quantities such as length is the arithmetic mean. The median value D50 of a size distribution is the value dividing the plurality of grains into two equal populations, one consisting of grains having ECD size above the value and the other half having ECD size at most the value. The mode of a size distribution is the value corresponding to the highest frequency of grains, which can be visualised as the peak of the distribution (distributions can include more than one local maximum frequency and be said to be multi-modal). Various other values d(y) can be provided, expressing the size below which a fraction y of the plurality of grains reside in the distribution. For example, d(0.9) refers to the ECD size below which 90 percent of the grains reside, d(0.5) refers to the ECD size below which 50 percent of the grains reside and d(0.1) refers to the ECD size below which 10 percent of the grains reside.

As used herein, refractory material will remain in the solid state up to at least about 2,000° C., at least about 1,000° C. or at least about 700° C. (at sea level atmospheric pressure up to at least about 1 GPa). Some refractory materials may have a sufficiently high Young's modulus, shear strength, thermal conductivity, electrical conductivity, friction or other property up to the high temperature, depending on the application of the material. Some refractory material may not undergo a phase change up to at least the high temperature.

The invention claimed is:

1. Composite material comprising
    50 to 95 mass % grains of primary material, in which the primary material consists of talc;
    grains of secondary material comprising silicon carbide, zircon, mullite or garnet; and
    0.01 to 40 mass % fibres having
        a mean length of 0.05 to 20 mm, and
        a ratio of length to diameter of at least 5; in which
    the grains of the primary material have a mean size of 3 to 150 microns; and
    the fibres consist of any of carbon, SiC and alumina.

2. The composite material as claimed in claim 1, wherein the fibres have a mean length of at least 0.1 mm, the ratio of length to diameter is at least 10 and the grains of the primary material have a mean size of 5 microns.

3. The composite material as claimed in claim 1, comprising 0.01 to 40 mass % grains of a secondary material comprising material selected from the group consisting of ceramic material, cubic boron nitride (cBN) or diamond.

4. The composite material as claimed in claim 3, in which the secondary hard material grains have a mean size of 1 to 200 microns.

5. The composite material as claimed in claim 1, in which the mean length of the fibres is at least 20 times their mean diameter.

6. The composite material as claimed in claim 1, comprising at least 0.1 mass % fibres, and in which the fibres have a mean length of at least 0.5 mm.

7. The composite material as claimed in claim 1, in which the fibres are in the form of continuous fibres, tangled fibres, multi-fibres, single fibres, or chopped fibres.

8. The composite material as claimed in claim 1, in which at least 50% of the fibres have a length within 20% of the mean length of the fibres.

9. The composite material as claimed in claim 1, comprising inorganic binder material.

10. The composite material as claimed in claim 1, in which the fibres consist of carbon.

11. The composite material as claimed in claim 1, comprising
    grains of cBN crystals having a mean size of at least 10 microns.

12. The composite material as claimed in claim 1,
    in the form of a compact having
        density of at least 95% of the theoretical density of its constituent materials, the density contribution of each material weighted according to its mass % in the composite material.

13. The composite material as claimed in claim 1,
    in the form of a non-bonded aggregation of powder grains.

14. A component comprising composite material as claimed in claim 1.

15. A component as claimed in claim 14, for a capsule for an ultra-high pressure press, comprising
    a gasket, a containment vessel, an electrically conducting heater element, an electrical insulation component, or a reaction compact.

16. A component as claimed in claim 14, consisting of
    a gasket for a belt-type press, a tetrahedral-type press or a cubic-type press for pressurising a reaction assembly at an ultra-high pressure of at least 1 GPa;
    comprising composite material as claimed in claim 1.

17. A component as claimed in claim 14, consisting of
    a heater element for a belt-type press, a tetrahedral-type press or a cubic-type press for pressurising a reaction assembly at an ultra-high pressure of at least 1 GPa;
    comprising composite material as claimed in claim 11.

18. A component as claimed in claim 14, consisting of
    a reaction compact for synthesising cBN crystals in a belt-type press, a tetrahedral-type press or a cubic-type press for pressurising a reaction assembly at an ultra-high pressure of at least 1 GPa;
    comprising composite material as claimed in claim 1.

19. A method of using a component as claimed in claim 14, in which
the component is for a capsule assembly for an ultra-high pressure press, and
the method includes
assembling a capsule including the component within the ultra-high pressure press, and
using the ultra-high pressure press to pressurise at least a volume of the capsule assembly to at least 1 GPa.

20. A method of using a component as claimed in claim 19, in which
the component consists of a gasket for a belt-type ultra-high pressure press comprising a pair of opposable anvils and a die, and
the method includes
providing a pair of the components; and
assembling the capsule assembly within the die, in which each component is placed against a respective end of the die.

21. A method of using a component as claimed in claim 19, in which
the component consists of a gasket for a cubic-type ultra-high pressure press, comprising three pairs of opposable anvils, and
the method includes
assembling the capsule assembly including the component between all three pairs of anvils.

* * * * *